US012609974B2

(12) United States Patent
Olson

(10) Patent No.: US 12,609,974 B2
(45) Date of Patent: Apr. 21, 2026

(54) WEB-BASED REAL-TIME COMMUNICATION APPLICATION AND METHODS

(71) Applicant: Project Vara LLC, Avondale, AZ (US)

(72) Inventor: Rich Olson, Henderson, NV (US)

(73) Assignee: Project Vara LLC, Avondale, AZ (US)

( * ) Notice: Subject to any disclaimer, the term of this patent is extended or adjusted under 35 U.S.C. 154(b) by 0 days.

(21) Appl. No.: 18/104,590

(22) Filed: Feb. 1, 2023

(65) Prior Publication Data

US 2024/0259441 A1 Aug. 1, 2024

(51) Int. Cl.
*G06F 15/16* (2006.01)
*H04L 65/1069* (2022.01)
*H04L 65/1108* (2022.01)

(52) U.S. Cl.
CPC ...... *H04L 65/1108* (2022.05); *H04L 65/1069* (2013.01)

(58) Field of Classification Search
CPC .......................... H04L 65/1108; H04L 65/1069
See application file for complete search history.

(56) References Cited

U.S. PATENT DOCUMENTS

| | | | | |
|---|---|---|---|---|
| 2015/0067019 A1* | 3/2015 | Balko | .................. | G06F 9/5038 |
| | | | | 709/202 |
| 2020/0204601 A1* | 6/2020 | Jokela | .................. | H04L 67/141 |
| 2020/0382563 A1* | 12/2020 | Jokela | ................ | H04L 65/1108 |
| 2022/0385491 A1* | 12/2022 | Morris | ................ | H04L 12/1822 |
| 2024/0080275 A1* | 3/2024 | Kolan | .................. | H04L 47/805 |

* cited by examiner

*Primary Examiner* — Padma Mundur
(74) *Attorney, Agent, or Firm* — CALFEE, HALTER & GRISWOLD LLP

(57) ABSTRACT

A method for exchanging information between devices including, via a session manager located on a server, receiving a connection request from a first user device is disclosed. The method includes saving to a memory on the server a communications array storing communication parameters for the first user device, receiving a connection request from a second user device. It includes saving to the array communication parameters for the second user device, and initiating a Web Real-Time Communication (WebRTC) connection between the first user device and the second user device based at least in part on the stored communication parameters for the first user device and the communications parameters for the second user device.

20 Claims, 9 Drawing Sheets

WebRTC Channel 200

WebRTC Alternative Channel 300

Server 110

User Device 130

User Device 140

Session Manager 310

302  User Device 130 connects to a session manager 310

304  Session manager 310 creates an array 320 for channel 300

306  Session manager 310 populates array 320 with first user device 130 connection parameters 308  Session manager 310 "listens" for another user to add to channel 300

300

```
{
  "_id": "_sessionId",
  "moderatorsession": [
    {
      "moderatorId": "JFEDjM54fRvaH2epZ",
      "moderator_streamId": "kJHUXa9E78TXGc4eSpdoXDQWOj0hpkPy8iVa",
      "moderator_userId": "JFEDjM54fRvaH2epZ",
      "room_id": "JFEDjM54fRvaH2epZ",
      "camera_id": "e9ed3d750a0d295c6755cbeab1b466fabfa30b831d2a4239b0b11ebf7a3593ee",
      "location": {
        "lat": 36.0808448,
        "lon": -115.0353408
      },
      "muted": false,
      "ipAddr": "98.188.56.212",
      "dimensions": {
        "width": 1170,
        "height": 658
      },
      "orientation": "landscape",
      "platform": "desktop"
    }
  ],
  "usersession": [
    {
      "moderatorId": "JFEDjM54fRvaH2epZ",
      "moderator_streamId": "kJHUXa9E78TXGc4eSpdoXDQWOj0hpkPy8iVa",
      "moderatoripAddr": "98.188.56.212",
      "user_streamId": "G9ZwbWZxgfZczTv1MKmuEZTnpS2jHMN5Y0Sy",
      "stream_userId": "ewezowvixms",
      "platform": "desktop",
      "userId": "FiomFMoHPab4cF4pG",
      "orientation": "landscape",
      "location": {
        "lat": 36.0808448,
        "lon": -115.0353408
      },
      "muted": true,
      "ipAddr": "98.188.56.212",
      "dimensions": {
        "width": 1170,
        "height": 658
      }
    }
  ]
}
```

WEB-BASED REAL-TIME COMMUNICATION APPLICATION AND METHODS

FIELD

The concepts presented herein relate to applications of web-based real-time communications. More specifically, this disclosure relates to establishing and maintaining real-time communications channels over the web and/or other portals.

BACKGROUND

Web Real-Time Communication (WebRTC) is an open-source project allowing application programming interfaces (APIs) to provide audio and video communications over the internet. Typical applications include video conferencing, live video streaming, as well as screenshare and other forms of live presentation. Recent events, such as the COVID-19 pandemic, have caused an explosion of the use of these systems for business communication, educational purposes, and even recreational purposes.

Existing WebRTC applies constraints to communication parameters (e.g., screen types, screen orientation, etc.) during connection initialization. WebRTC API scan adapt to certain changes in bandwidth during an ongoing connection. However, real-time adaptability of WebRTC is limited. For example, WebRTC cannot currently adapt to the eccentricities of various devices (e.g., optimizations specific to display, connectivity, audio quality, etc. specific to a phone version or model, whether iOS or Android) in real-time. If screen orientation changes (e.g., from portrait to landscape or vice versa), the device running the WebRTC will re-orient the video. This new orientation may not be registered or rendered by the WebRTC application. Therefore, the WebRTC applicant cannot determine and apply new optimizations to the new screen orientation to the live video stream.

Typically, the developer would use WebRTC's built-in data channel to communicate the change across peers and servers. While this can create a low-latency network, it is also limited to the scope to the real time data channel interface of the WebRTC API. A developer who endeavored to add features to, and/or monitor and modify real-time communications on a WebRTC platform would find limited options for doing so. This is because WebRTC communications channels and the code that runs them are relatively inflexible. Therefore, a new method and/or system is needed that can modify WebRTC communications using channels other than the built-in channels of WebRTC.

SUMMARY

This disclosure includes a method for exchanging information between devices including, via a session manager located on a server, receiving a connection request from a first user device. The method includes saving to a memory on the server a communications array storing communication parameters for the first user device, receiving a connection request from a second user device. It includes saving to the array communication parameters for the second user device and initiating a Web Real-Time Communication (WebRTC) connection between the first user device and the second user device based at least in part on the stored communication parameters for the first user device and the communications parameters for the second user device.

This disclosure further includes a system for exchanging information between devices comprising a session manager located on a server configured to receive a connection request from a first user device. The system is configured to save to a memory on the server a communications array storing communication parameters for the first user device, receive a connection request from a second user device, save to the array communication parameters for the second user device, and initiate a Web Real-Time Communication (WebRTC) connection between the first user device and the second user device based at least in part on the stored communication parameters for the first user device and the communications parameters for the second user device.

This disclosure also includes a method for establishing a communications channel by storing on a server, via a session manger, an array comprising connection parameters on a server. The connection parameters include connection parameters associated with a first user device, connection parameters associated with a second user device. The method includes sending, via the session manager to the first user device, a request for information to populate the connection parameters associated with the first user device. It includes receiving, via the session manager, the requested information for populating the connection parameters associated with the first user device, storing, on the server via the session manager, the connection parameters associated with the first user device in the array. The method includes receiving, via the session manager, an identifier from the second user device, the identifier identifying the first user device. The method includes sending, to the second user device via the session manager, a request for information to populate the connection parameters associated with the second user device. The method includes receiving, via the session manager, the requested information for populating the connection parameters associated with the second user device. It includes storing on the server, via the session manager, the connection parameters associated with the second user device in the array. The method includes establishing, via the session manager, a WebRTC connection between the first user device and the second user device using the connection parameters associated with the first user device and the connection parameters associated with the second user device.

BRIEF DESCRIPTION OF DRAWINGS

FIG. 3D shows the data structure of an exemplary array 320a that may be created by the session manager 310;

DETAILED DESCRIPTION

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

Overview of the Disclosed Systems and Methods

The present disclosure proposes novel systems and methods that facilitate WebRTC communications using additional communications channels. The additional channels can allow user devices to communicate with a session manager concerning connection parameters specific to the user device's hardware and software. These connection parameters can relate to the display of a video stream, for example. The system and methods disclosure herein may adjust or change the parameters. Doing so allows user devices to share information without using the WebRTC connection that can both facilitate and enhance their conversation, and better utilize resources over the WebRTC connection. The additional channels can exchange information between user devices even when the WebRTC channel becomes disconnected or lacks the bandwidth for these communications.

Detailed Description

Figure 1:
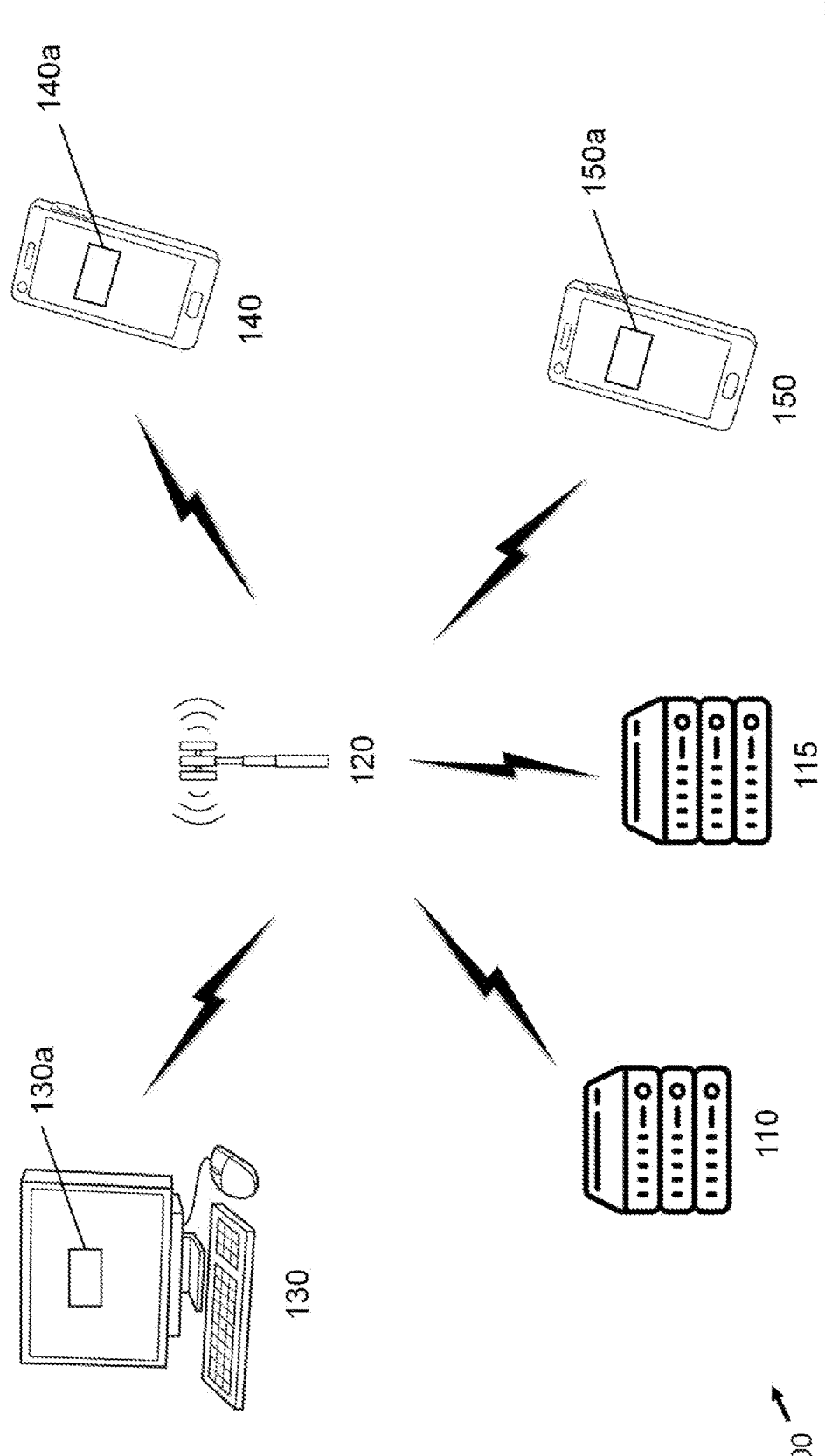
FIG. 1 shows a connection setup 100 that may facilitate a WebRTC call according to aspects of the present disclosure.

FIG. 1 shows a connection setup or network 100 for facilitating a WebRTC connection in conjunction with aspects of the present disclosure. As shown in FIG. 1, a server 110 may facilitate WebRTC and other communications between two or more user devices (e.g., "user devices" represented by terminal 130 and phones 140 and 150). The user devices may connect to the sever 110 via wireless connection 120. However, any suitable means of connection may be used (e.g., cellular, other wireless internet, wired connection, ethernet, etc.). In the setup 100 in FIG. 1 the server 110 may initiate a WebRTC connection between user devices 130 and 140. As discussed in more detail below, alternatively, other servers, terminals, or devices may facilitate communications channels separate and apart from this WebRTC connection. For example, FIG. 1 shows an additional server 115 that may manage a WebRTC connection otherwise facilitated by server 110, and vice versa. The servers 110 and 115 may also facilitate communication channels between user devices that exist separate and apart from the WebRTC connection.

In principle, any number of user devices 130-150 may be connected to setup 100. User devices may connect with any suitable connective device and by any suitable connection means. Although FIG. 1 shows the connection setup 100 as static, it is to be understood that it may be dynamic. User devices may connect to servers 110 and 115 and disconnect over time. For example, server 110 may establish a WebRTC connection between user devices 130 and 140 that is managed by a session manager located on server 115. As discussed in more detail below, session manager 115 may establish an alternative, or non-WebRTC connection, between user devices 130 and 140 at the same time as the WebRTC connection. After initiation, user device 150 may join the WebRTC connection that the connection it now includes user devices 130, 140, and 150 at once. Subsequently, user device 140 may leave the WebRTC connection. Additionally or alternatively, user devices may connect to each other via server 110 and/or directly to one another without use of server 110.

Figure 2A:
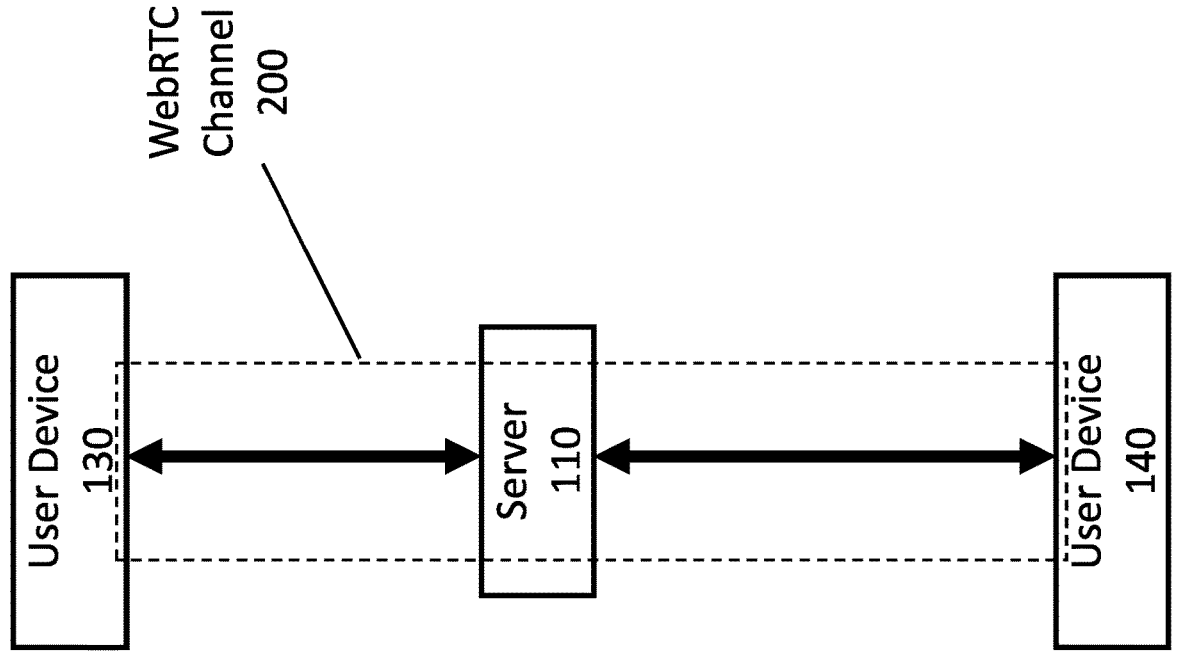
FIG. 2A shows a WebRTC connection 200 that may be established according to aspects of the present disclosure.

FIG. 2A shows a WebRTC channel 200 connection between two user devices 130 and 140 according to the present disclosure. As shown in FIG. 2A, the WebRTC channel 200 facilitates communications (double arrows) between the user devices are routed through server 110. As discussed in the context of FIG. 1 above, server 110 may be wirelessly connected or have wired connection between user devices 130 and 140.

Figure 2B:
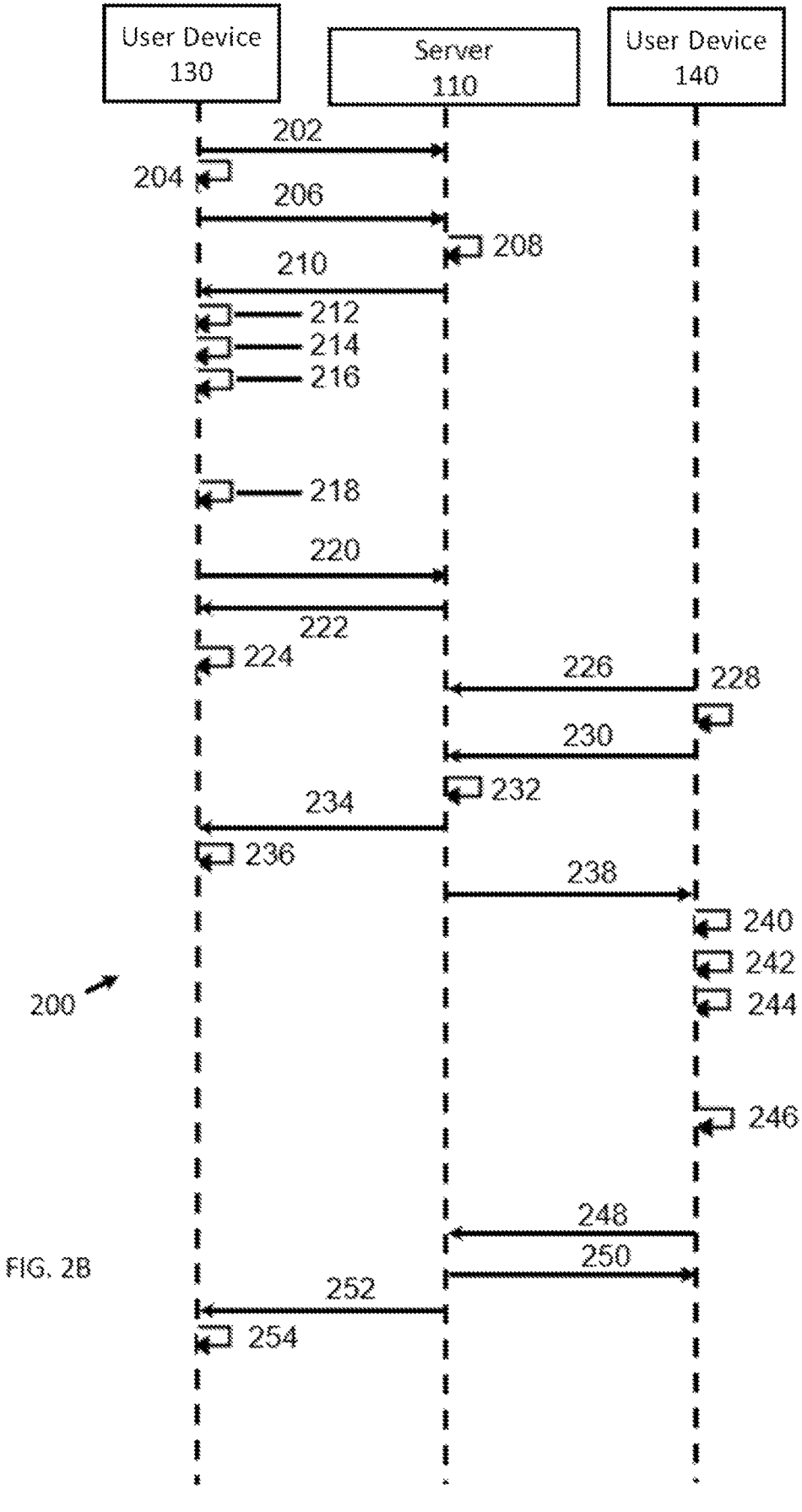
FIG. 2B shows setup of an exemplary WebRTC connection 200 that may be according to aspects of the present disclosure.

FIG. 2B shows setup of the WebRTC connection 200. Connection 200 can be established with the setup 100 of FIG. 1. Only an overview of an exemplary WebRTC connection is presented here because this disclosure focuses on establishing a communication channel that works in tandem with WebRTC (FIGS. 3A-3C), rather than the WebRTC channel itself.

The WebRTC communications connection 200 may include the three components shown in FIG. 2B: a first user device 130 and a second 140, and a server 110. However, the number of user devices in the connection 200 is not limited to two, nor is the number servers limited to one. In fact, connection 200 may include any suitable number of user devices allowed by the bandwidth of devices involved. As discussed in the context of FIG. 1, user devices may be added or dropped with respect to WebRTC connection 200 at any given time while the connection 200 remains in place. Server 110 may be any suitable type of server (e.g., a remote or local server associated with a particular WebRTC service). Alternatively, server 110 may include another suitable device for communications, including any of the devices shown in FIG. 1 (e.g., terminal 130).

FIG. 2B shows steps in establishing a WebRTC connection 200 between user devices 130 and 140 via server 110. The connections shown in FIG. 2B are merely exemplary. Other WebRTC connection schemes than 200 may be used in the context of the present disclosure. The exact WebRTC connection scheme is limited only by its ability to transfer suitable information (e.g., streaming video and/or audio content) over the connection.

As shown in FIG. 2B, first user device 130 may connect to the server 110 at step 202, establishing its request for a WebRTC connection. Correspondingly, the user device's terminal or browser (e.g., browsers 130a, 140a, and 150a in FIG. 1) may prompt the first user device 130 to name the WebRTC channel at step 204. At step 206, the user device 130 may send the name (e.g., "WebRTC channel 1" or "user device channel 1") to the server 110. During step 208, the server 110 creates the new WebRTC channel associated with communications to first user device 130, typically giving the channel 200 the name selected in step 204. In step 210, the server 110 notifies the user device 130 that the channel has been created with the chosen name. Subsequently, the user device 130 sets its identification as "initiator" or "moderator," in step 212, since first user device 130 is the entity that started the session. In step 214, first user device 130 then prompts the user device for permission to use a media input for the WebRTC (e.g., in a "getUserMedia( )" function call).

In step 216, the user device 130 initiates a routine, e.g., getUserMedia( ) success handler, to retrieve parameters for the connection 200 associated with its hardware (e.g., display or audio parameters). In step 218, a local stream attaches user device 130 to a local media element (e.g., video and/or audio) associated with the newly established connection. For example the function attach MediaStream (localVideo, stream) may be called here. In step 220, the user device 130 notifies the server 110 that media has been identified for user device 130. In step 222, the server 110 sends a connection log to the user device 130. In step 224, the user device 130 pauses (e.g., by calling the checkAndStart( ) function to pause until channel is ready). The server 110 remains paused with respect to the WebRTC connection to first user device 130 until a second user device connects to the channel with a request to connect to first user device 130.

At step 226, a second user device 140 requests to connect with server 110. At step 228, user device 140 prompts for a channel name for the requested connection (e.g., via a browser on a display on user device 140's terminal). At step 230, user device 140 then executes a create or join function using the channel name requested from the user device in step 228. At step 232, the server 110 joins user device 140 to the selected channel. Assuming the selected channel is the same as the one established by user device 130 (e.g., "WebRTC channel 1" or "user device channel 1"), server 110 then broadcasts the joining event to user device 130 in step 234. At step 236, user device 130 marks the channel it has created and user device 140 has selected as "ready." In step 238, the server 110 sends the joining indicator to user device 140. At step 240, user device 140 marks the selected channel as "ready." User device 140 then, at step 242, obtains its user device media parameters (e.g., "getUserMedia( )"), and activates success handler with the media parameters at step 244.

In step 246, a local stream in user device 140 is attached to a local media element (e.g., video and/or audio) associated with the newly established connection. This is represented in FIG. 2B as calling the function attachMediaStream (localVideo, stream). In step 258, the user device 140 notifies the server 110 that media has been identified for user device 140. In step 250, the server 110 sends a connection log to the user device 140. In step 252, the server 110 broadcasts a "got user device media" message to user device 130. In step 254 checks the log and initiates the WebRTC communication with user device 140.

As discussed in the context of FIG. 2B and WebRTC connection 200 (above), the type of information exchanged in establishing and maintaining a WebRTC connection is limited. In some cases, WebRTC software is inflexible and limitations on information it handles are hard-wired into the WebRTC code. Most WebRTC connections 200 perform an initial exchange of device parameters and device-specific information (e.g., parameters and specific information for user devices 130, 140, and 15) at connection (e.g., steps 202 and 226 in FIG. 2B). WebRTC connection will also establish a type or types of media sought to be exchange over connection 200 (e.g., steps 252-254).

However, once the connection stream begins at step 252, there may be a limited ability to exchange information between user devices 130 and 140 and server 110 other than the content of the streamed video or audio (or other data, e.g., screen share). While WebRTC generally includes a data channel that can be reserved for these and other communications, the WebRTC data channel is reliant on the WebRTC connection itself. For this reason, the WebRTC data channel can be relatively easily disabled by connection errors.

Changes in user devices 130 and 140 are not necessarily registered and adjusted for in real time by server 110 with respect to the WebRTC connection. For example, if user device 140 tilts her phone such that the video stream from the WebRTC connection 200 is re-oriented from landscape to portrait, server 110 may not register or compensate for this change. This can lead to a mismatch between the configuration or optimization of the video feed sent from server 110 to device 140 without any built-in ability of the WebRTC to correct or ameliorate. Many WebRTC lack the capability to implement such changes entirely.

Figure 3A:
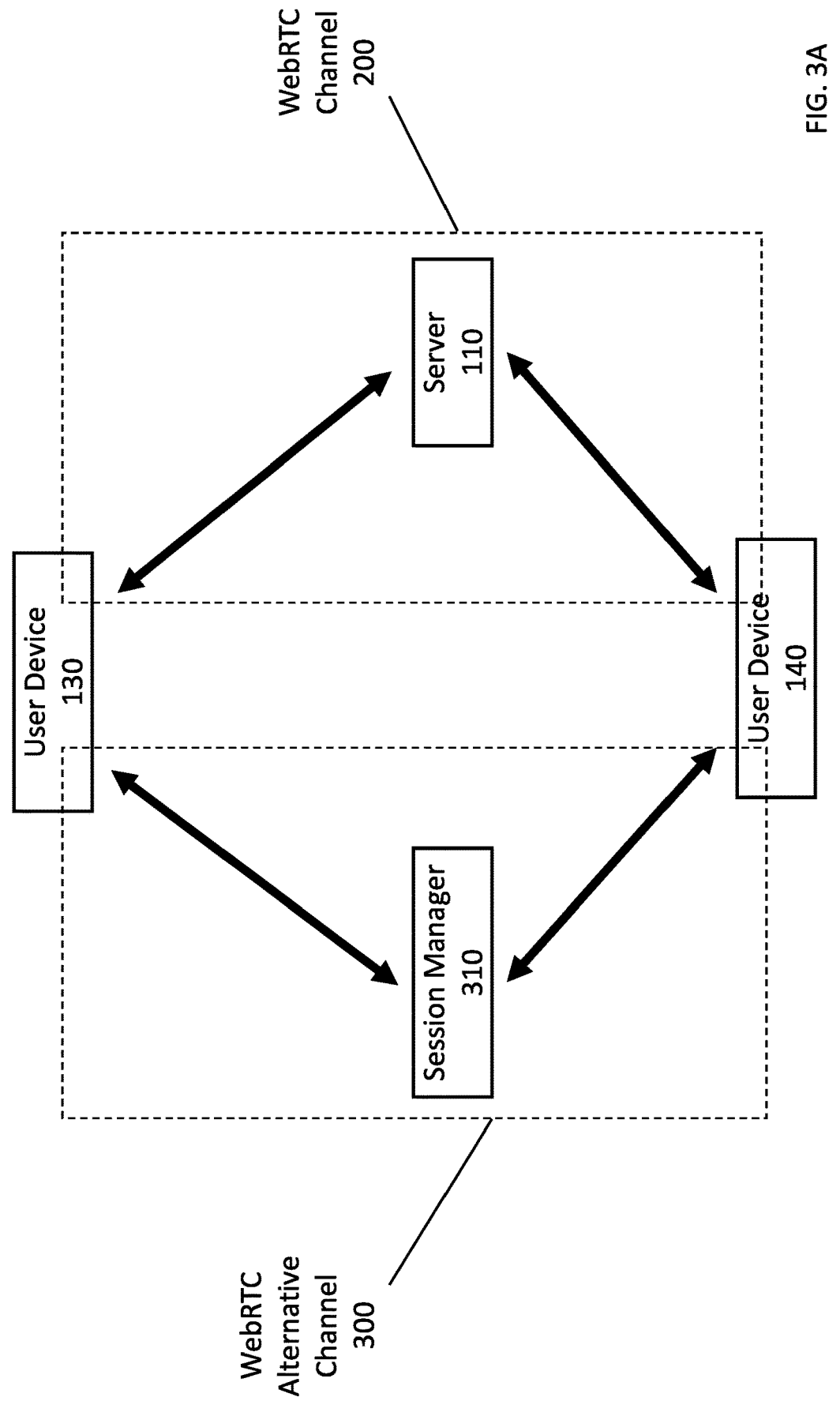
FIG. 3A shows a WebRTC alternative channel 300 connection to establish and maintain a channel 300 separately from WebRTC according to aspects of the present disclosure.

FIG. 3A shows a way to address these deficiencies in WebRTC according to the present disclosure. Specifically, FIG. 3A shows the anatomy of a WebRTC alternative channel 300 communications connection for establishing and maintaining a communications channel 300 separate and apart from WebRTC. Channel 300, and others disclosed herein, will be referred as "WebRTC alternative channels." Channel 300 provides a means for user devices, e.g., user devices 130 and 140, to share communications information outside of WebRTC. As shown in FIG. 3A, Communications channel 300 is parallel and can operate concurrently to a WebRTC communication 200. FIG. 3A shows a session manager 310 facilitating channel 300 communications. Session manager 310 may run on a server, e.g., server 115 (FIG. 1). As with server 115, session manager 310 may be wirelessly connected or have wired connection between user devices 130 and 140.

As suggested by FIG. 3A, session manager 310 is a facilitator of channel 300. Session manager 310 can process, send, and receive communications on the channel 300 between user devices (e.g., user devices 130-150, FIG. 1). Session manager 310 can include, for example, a persistent server-side data store (e.g., mongoDB, MySQL, etc.) that exists outside the scope of WebRTC channel 200 or any other WebRTC channel. As discussed in detail below, session manager 310 may store communications information to memory, as well as information about settings and hardware of devices in setup 100. Session manager 310 may be physically located on the same server, i.e., server 110, FIG. 1, that facilitates the WebRTC connection 200. There may alternatively be advantages to locating session manager 310 on different hardware from that running WebRTC, e.g., a different, separate server and/or a separate server bank (e.g., server 115). Locating session manager 310 on a different server than the WebRTC server can prevent channel 300 from being subject to the same service interruptions and/or bandwidth limitations as the WebRTC channel 200. Since channel 300 can facilitate communications between user devices, locating session manager 310 on a different server than server 110 can allow those communications to persist even when there is an interruption in WebRTC service.

Session manager 310 may be connected to user devices (e.g., user devices 130, 140, and 150) via any suitable connection means. As shown in FIG. 1, one such connection means may be a cellular or wireless network 120. However, it is to be understood that the session manager 310 may be connected to user devices in the system 100 by any suitable means, including by wired connection, Bluetooth, and wi-fi. All that is required is that the session manager 310 be able to communicate the information discussed below with the user devices and that the user devices be able to identify session manager 310 in the system 100.

One advantage of WebRTC alternative channel 300 is that it can utilize infrastructure and have access to information that is not already built into WebRTC. It can be modified according to the user device's needs and/or the needs of the communication channel 300. This can expand the user device's control over the WebRTC experience and increase functionality well beyond WebRTC infrastructure. For example, channel 300 can manipulate data structures and variables that control aspects of user device equipment ordinarily outside the scope of WebRTC communication. A WebRTC alternative channel 300 may fit screen resolution to changes in screen orientation as they occur in real-time when the user device re-orients his or her phone (e.g., phone 150). Session manager 310 can monitor and optimize, in real-time, aspects of the user device experience according to preference or communications standards. Session manager 310 can also continue communication between user devices even when the WebRTC channel is interrupted or not functioning optimally. More generally, channel 300 may allow user devices to share certain information outside of WebRTC to preserve WebRTC bandwidth. For example, it may allow user devices to switch settings (e.g., turn video off) to facilitate WebRTC communication. It may broadcast the settings changes to other user devices and adjust their settings to continue communication seamlessly. Channel 300 may allow a user device to post information to members of a WebRTC discussion even after that user device has dropped from the WebRTC channel 200. This could, for example. be a farewell message to the group or a follow-up to a discussion topic addressed in the WebRTC discussion. These and other advantages will be discussed in context below.

Figures 3B, 3C:
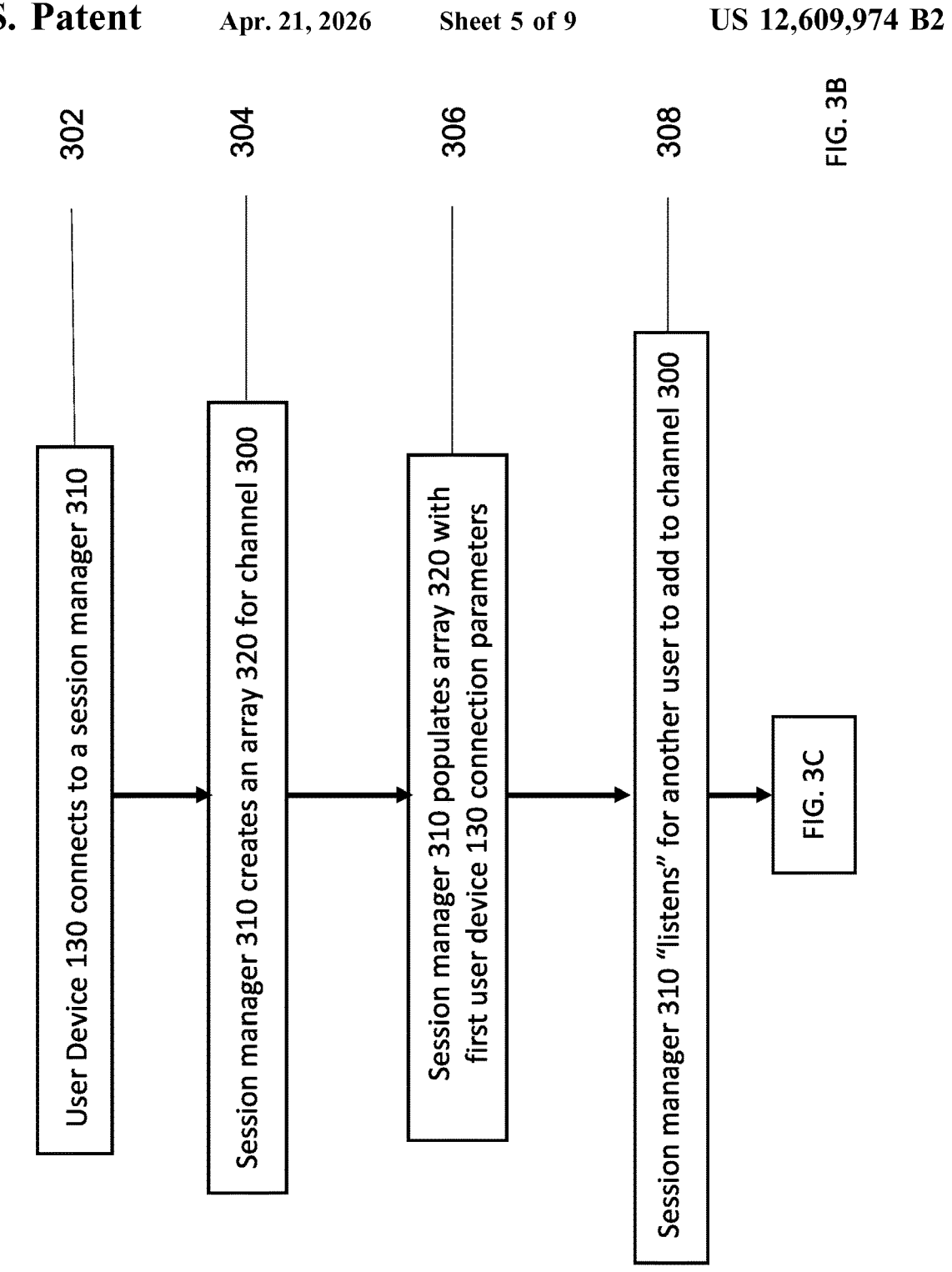
FIG. 3B is a flowchart to establish and maintain a channel 300 separately from WebRTC to address these deficiencies according to the present disclosure.
FIG. 3C continues the flowchart of FIG. 3B.
Figure 3C:
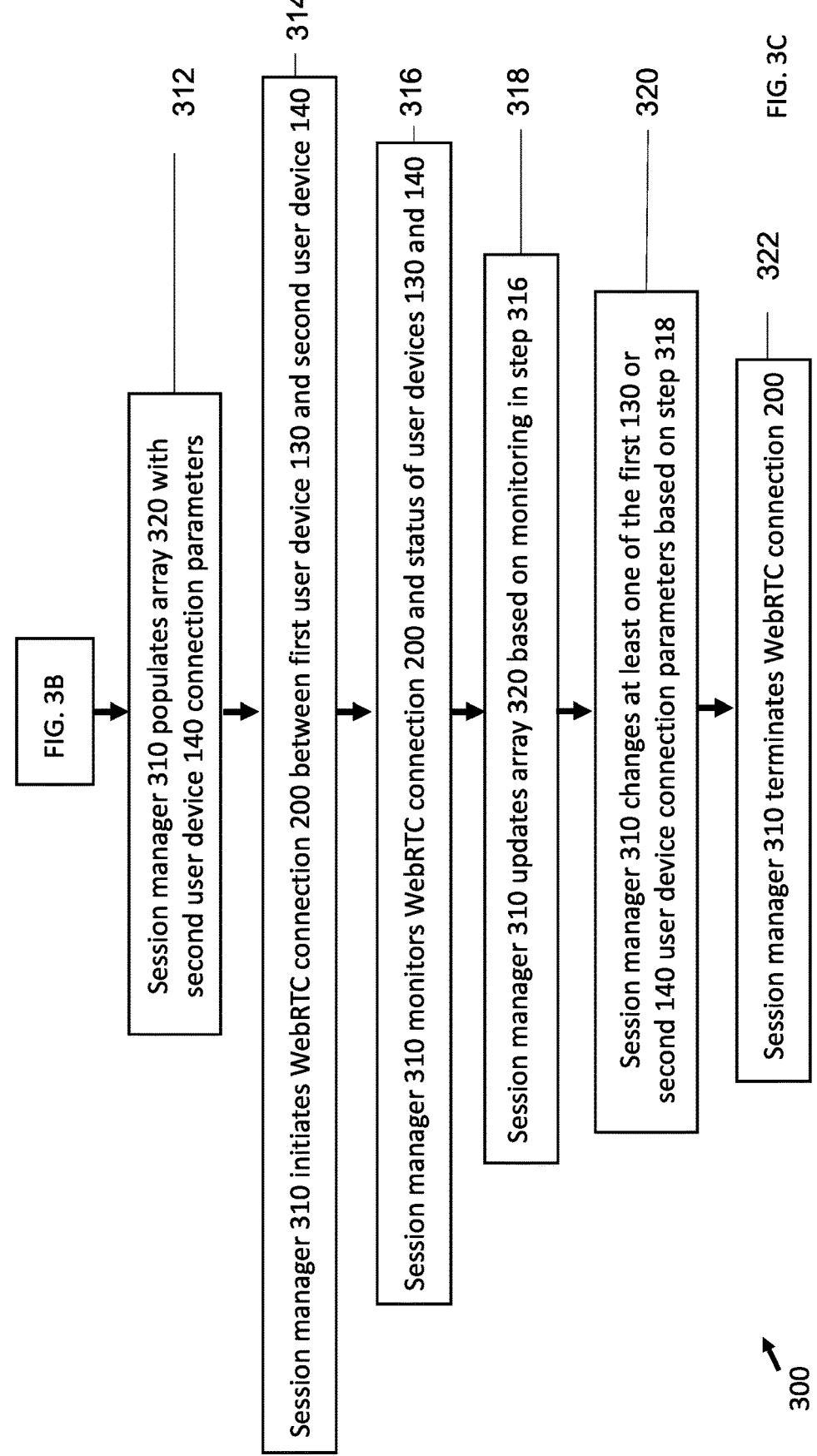

FIGS. 3B-3C show steps, according to the present disclosure, to establish and maintain channel 300. The setup establishes a channel 300 allowing user devices to share communications information, and other information, outside of WebRTC. Communications may be sent and received via channel 300 in parallel with WebRTC, as represented schematically in FIG. 3A.

Starting in FIG. 3B, in the first step 302, the first user device 130 connects to a session manager 310 to initiate set up the WebRTC alternative communications channel 300. The "first" user device 130 in this context is the user device who initiates the connection with the session manager 310. It is to be understood that the first user device 130 can be any user device described herein. In fact, one user device can initiate a channel (channel A) and, therefore, be channel A's "first user device" and be a subsequent/joiner user device on another channel (e.g., channel B) initiated by a different user device. User devices can be active on multiple WebRTC alternative channels 300 as well was multiple WebRTC channels 200 at once.

Once channel 300 is initiated, communications between session manager 310 and user devices may take place via any suitable method. One example is a browser 130a (e.g., a web browser such as Chrome, Internet Explorer, Safari, etc. or similar browsers 140a and 150a) located on the monitor of first user device 130's screen. Browser 130a can be configured to collect information from the first user device 130 to facilitate the connection process, as well as alter aspects of communications via channel 300 in real time.

At step 304, the session manager 310 creates a data structure, e.g., an array 320, for facilitating channel 300 communications. Array 320 may be stored locally on server 115, for example. Array 320 may hold, for example, communications parameters specific to the first user device 130. Array 320 may also hold similar or the same communications parameters for additional user devices as they are added the channel 300. In principle, array 320 is customizable by a user device and developer to hold essentially any type of information that might facilitate WebRTC or other communications and connections.

FIG. 3D shows the data structure of an exemplary array 320a that may be created and stored by session manager 310. As shown in FIG. 3D, array 320a may include a "moderatorid" and "moderator_userid" parameters. In this context, the first user device 130 who sets up the channel 300 is most likely to be designated moderator. Array 320a also includes a "room_id" parameter that stores the name of the channel, most likely named by the moderator. For example, the first user device 130 can set the room_id via browser 130a. As shown in FIG. 3D, array 320a may store specific aspects of hardware and hardware settings for the moderator or first user device 130 (e.g., "camera_id," "muted," screen "dimensions," "ipAddr," screen "orientation," the type of platform "desktop," and "location"). As discussed in more detail below, these settings can be monitored and updated in real time as they change. The updates can be used to optimize or improve the user experience with respect to a WebRTC communication 200. It is to be understood that names used to describe data structures, variables, or other constructs in the context of arrays 320 and 320a are merely exemplary. Other names for these structures, variables, or other constructs may be used without departing from the scope of this disclosure. Moreover, the identify and definitions of the variables themselves are also merely exemplary. Variables may be added to the data structure as needed or desired. Tables 1 and 2 below compile the variables in array 320a.

TABLE 1

| Quantities associated with the moderator in array data structure 320/320a. | |
|---|---|
| Exemplary Quantity Included in Array 320/320a Associated With Moderator | Corresponding Meaning |
| moderatorsession | Data structure that holds quantities associated with a "moderator," or first user device/initiator of a WebRTC alternative channel 300. |
| modoratorid | Name of moderator. |
| moderator_streamid | An id assigned to track the moderator's video stream. |
| moderator_userid | User device identification of moderator. |
| room_id | Name of the WebRTC alternative channel 300. |
| camera_id | Identifying information for the camera being used by the moderator to communicate. |
| location | The physical location of the moderator in longitude and latitude. |
| muted | Whether or not the moderator is muted. |
| ipAddr | The internet protocol address of the moderator. |
| dimensions | Physical dimensions of the device the moderator uses to communicate. These can be used to calculate optimal resolution to render video, for example. |
| orientation | The orientation (e.g., landscape or portrait) of a video screen on the moderator's device. |
| platform | The type of platform used by the moderator (e.g., smartphone, laptop, or desktop). |

TABLE 2

| Quantities associated with a non-moderator user device in array data structure 320/320a. | |
|---|---|
| Exemplary Quantity Included in Array 320/320a Associated With User device | Corresponding Meaning |
| user devicesession | Data structure that holds quantities associated with a "user," or joiner of the WebRTC alternative channel 300. |
| modoratorid | Same as above. |
| moderator_streamid | Same as above. |
| moderatoripAddr | Same as "ipAddr." |

TABLE 2-continued

Quantities associated with a non-moderator user
device in array data structure 320/320a.

| Exemplary Quantity Included in Array 320/320a Associated With User device | Corresponding Meaning |
|---|---|
| user_streamid | An id assigned to the user's video stream. |
| location | The physical location of the user device in longitude and latitude. |
| userid | Name of user device. |
| orientation | The orientation (e.g., landscape or portrait) of a video screen on the moderator's device. |
| location | The physical location of the user device in longitude and latitude. |
| muted | Whether or not the user device is muted. |
| ipAddr | The internet protocol address of the user device. |
| dimensions | Physical dimensions of the device the moderator uses to communicate. This can allow calculation of an optimal resolution. |

Although not shown in FIG. 3D, generally array 320/320a can accommodate more than two user devices. In principle, there is no limit to how many user devices can use a channel 300. The same or similar information (e.g., "camera_id," "muted," screen "dimensions," "ipAddr," screen "orientation," the type of platform "desktop," and "location") may be stored for additional user devices (under other "usersession" parameters). In the latter case, each user device can have its metadata stored as an object (key:value) within the array, for example.

Note that, in principle, there is no limit to how many user devices may use channel 300. However, there may be a practical limit based on hardware and bandwidth of the components involved including the hardware on which the session manager 310 is located. The particular platform or code used to implement arrays 320 or 320a is not particularly important to the application. Any suitable platform may be used to implement array 320.

Turning back to FIG. 3B, in step 306, the session manager 310 populates array 320 with connection parameters obtained from first user device 130. These can be the parameters in array 320a, for example. Here, the session manager 310 will query the first user device 130 as to the name that can be used by other user devices and the session manager 310 to identify the channel ("room_id"). This is because, as the first user device for the channel, the first user device 130 is the moderator by default. The "room_id" may set directly by the user device via browser 130a. However, the exact method by which the session manager 310 obtains the "room_id" may vary. In some examples, the session manager 310 may set the "room_id" according to its own protocol, e.g., according to counter of such channels or naming scheme. The precise "room_id" is not important except insofar as other user devices wanting to join have access to the name so that they may identify the channel 300 in a connection request.

This step also includes the session manager 310 obtaining information from the first user device 130 regarding the user device's connection parameters (e.g., "dimensions," "orientation," "platform," etc.). The information can be obtained via the session manager 310 directly communicating with the operating system of user device 130's platform and a particular API on the platform that may furnish that information. In some cases, particularly those where preferences of the user device 130 are sought, the session manager 310 may query the user device 130 through browse 130a. Some examples of parameters that might be collected and stored in array 320 relating to user device preference might be the particular dimensions of any streamed video (as opposed to actual screen size), a color scheme "temperature," volume, sound equalization profile, type of device, processor, memory, screen dimension, client type (web browser, screen reader, etc.) location (latitude/longitude), device orientation (landscape/portrait), and blur values.

Information obtained may also include data transfer rate (e.g., maximum, minimum, and average) for the first user device 130 on network 100 and any constraints the user device might have for communicating on the network. Information obtained by the session manager 310 from the first user device 130 at this step may also include an identity or login of the account of the person operating user device 130. It may also include other aspects of this person's identity, including location, age, name, access permissions, preferred browser type, access history, etc.

In addition, information may be collected from the first user device 130 at this stage that determines what kind of WebRTC connection the channel 300 will facilitate. This could include whether there will be streaming video, audio, a screenshare functionality, chat functionality, etc. It may further include selection of the particular platform that will be used to communicate via the WebRTC channel 200 once it is set up. The platform may or may not be run in conjunction with browser 130a.

In step 308, the session manager 310 "listens" for another user device to join the channel 300 to communicate with first user device 130. In this step, a second user device 140 wishing to join the channel 300 will ultimately send a connection request to the session manager 310. This waiting or latency period may last until the connection request is sent. It may last beyond the connection request to allow more than one user device to join the channel 300. The listening step 308, in fact, may be ongoing with subsequent steps, so that the session manager 310 may add new user devices to the channel 300 even while communication between other user devices has already started and/or is ongoing.

Turning now to FIG. 3C, the session manager 310 may move onto the next step, 312, when another user device 140 contacts it with a connection request with the specific channel name ("room_id") that was identified in step 304. In step 312, the session manager 310 populates array 320 with connection parameters obtained from second user device 140. As discussed above, this step occurs after the second user device 140 has sent a communication request to the session manager 310 that identifies the particular communications channel 300 associated with the first user device 130. The second user device 140 may have received the name ("room_id") of the channel 300 either from the first user device 130 or some other user device of the channel 300.

At this stage, session manager 310 may check to see whether the second user device 140 is allowed to have access to the channel 300. Access parameters may be set either by the first user device 130 (e.g., in step 306) or by the session manager 300 itself. Alternatively, the network 100 may have certain connection rules or parameters that set access. If the second user device 140 is allowed access to the channel 300, the session manager 310 will query the second user device 140 for its connection parameters (e.g., "dimensions," "orientation," "platform," "width," "height," etc.) and use them to populate array 320. This step also includes the session manager 310 obtaining information from the second user device 140 regarding the user device's connection parameters (e.g., "dimensions," "orientation," "platform," etc.).

Some examples of parameters that might be collected and stored in array 320 relating to user device preference might be the particular dimensions of any streamed video (as opposed to actual screen size), a color scheme "temperature," volume, and sound equalization profile. Information obtained may also include data transfer rate (e.g., maximum, minimum, and average) for the first user device 130 on network 100 and any constraints the user device might have for communicating on the network. Information obtained by the session manager 310 from the first user device 130 at this step may also include an identity or login of the account of the person operating user device 130. It may also include other aspects of this person's identity, including location, age, name, access permissions, preferred browser type, access history, etc.

Once the session manager 310 has established connections with and collected information from user devices 130 and 140, it will initiate a WebRTC connection 200 between the user devices in step 314. The initiation in this step will be according to any protocols or preferences obtained from the first user device in step 306, which may or may not be stored in array 320. The initiation of the connection may also follow a protocol set by WebRTC and/or the server 110 that is running the WebRTC connection 200. As discussed above the WebRTC server 110 may or may not be the same server running the session manager 310. In many cases, the server platform running the session manager 310 will be different from server 110 and will have its own connection rules. In some cases, the session manager 310 may override connection rules of the server 110 in the case of conflict (and vice versa).

In step 314, connection will be established according to information obtained by the first user device 130 in step 306. For example, if user device 130 wishes to set up streaming video or audio, this will likely be done through the "moderator_streamid" parameter. In that case, the "moderator_streamid" parameters in the "user devicesession" portion of array 320 (i.e., the portion of array 320 associated with second user device 140) will be set equal to the "moderator_streamid" in the "moderatorsession" (i.e., the portion of array 320 associated with first user device 130). Although not indicated in FIG. 3C, screen sharing may also be set up at this time, as may be a chat box and/or other means of communication. All of these means of communication (streaming video, streaming audio, chat, and screenshare) may be set up through WebRTC channel 200 in lieu or in addition to the same means of communication (streaming video, streaming audio, chat, and screenshare) via WebRTC alternative channels 300.

In step 316, the WebRTC connection 200 between user devices 130 and 140 has been setup. Here the session manager 310 monitors the connection 200 and may change its parameters in real time. For example, session manager 310 may add new user devices to the WebRTC 200 connection if they make a connection request and are allowed to join. In this step, session manager 310 may monitor the quality and bandwidth of any streaming services set up in step 314. In particular, session manager 310 will query each of user device 130 and 140 to see if any of the connection (or other) parameters stored in array 320 has changed. If so, session manager will update array 320 with the changed information in step 318.

At step 320 session manger will determine whether or not changes detected in step 316 and saved in step 318 have had an impact on WebRTC communications on channel 200, on communications via channel 300, or on other communications. If the saved changes have affected performance, session manager 310 will determine whether further changes are necessary to improve performance. For example, if session manager detects in step 316 that user device 140's screen has changed orientation (e.g., from landscape to portrait or vice versa), session manager 310 will determine whether this change merits a change in other parameters such as screen resolution (as discussed above). If so, session manager 310 will change at least one of the first user device 130 or second user device 140 connection parameters stored in array 320 and at the devices that connect user devices 130 and 140 to network 100. Changes made by system manager 310 in this step will generally improve WebRTC or other communication between user devices 130 and 140.

Moreover, if session manger 310 finds quality of a streaming service less than ideal, session manager 310 may change aspects of the service to improve quality. One example would be if there is a lag in a video stream, session manager 310 may decrease the resolution of the video temporarily so that the video information can be sent and processed more quickly in order to eliminate the lag. In another, session manager 310 may decrease the quality of audio in audio streaming in order to improve connectivity and increase bandwidth for other aspects of the signal. Session manager 310 may eliminate or shut down services not being used (e.g., screen sharing) in order to devote more resources to the services being used (e.g., video and/or audio streaming). More generally, session manager 310 may monitor and optimize, in real-time, aspects of the user experience according to preference or communications standards. For example, if user device 130 prefers maintaining clarity in audio above all else, session manager 310 can prioritize audio and shut down other services or lower their resolution to reserve bandwidth.

In step 320, session manager 310 can expand the user device's control over the WebRTC experience beyond WebRTC infrastructure. For example, session manager 310 may fit screen resolution to changes in screen orientation as they occur in real-time when the user device 140 re-orients his or her phone. Smart phones can re-orient a screen showing a video feed in real-time according to the orientation of the hand-held device. When the screen re-orients, particularly if the physical screen is not square (e.g., as on user device 150's phone), the image may not be optimized for the new configuration. Here session manager 310 can crop, re-orient, and/or adjust resolution in one or more dimensions so that the image (or image stream) is optimized for the new orientation.

In step 320, session manager 310 can also adjust for variations that user device chooses in real time. For example, if the user device deliberately re-sizes the browser window that is streaming video, session manager 310 can communicate directly with the user device's device to adjust or optimize the resolution of the video for the new configuration. If channel 300 includes communication from more than one user device the session manager 310 can adjust the resolution of each video feed to match the size of the display (e.g., lower the resolution to preserver bandwidth if the video image is given a small size on a panel that shows video feed from multiple user devices). Session manager 310 can also, automatically, adjust video size, resolution, and orientation when a new user device is added and/or one is dropped. Session manager 310 can monitor and optimize, in real-time, aspects of the user device experience according to preference or communications standards. For example, the first user device 130 can specify a set of minimal communication standards (e.g., video or audio resolution) for the channel 200 to maintain. Session manager can adjust the above-described variables such that these standards are met.

In step 320, session manager 310 can also delegate portions of a WebRTC communication, normally over channel 200, such that it occurs over channel 300. This can save bandwidth in the WebRTC channel 200 and allow communication to continue when/if there are interruptions in that channel. For example, in the case of a WebRTC signal interruption on channel 200, one or more user devices can send a chat message to the others through channel 300 to let them know. When and if a user device wishes to sign off of the communication in WebRTC channel 200, the user device can send a notice using channel 300. Similarly, when a user device wants to or plans to return to the WebRTC communication, the user device can use channel 300 to signal this to participants prior to re-connecting to the WebRTC channel 200. A user device asked to follow-up on a topic of discussion can use channel 300 to post the follow-up to the chat group without having to re-join the WebRTC channel 200.

Finally, in step 322, when signaled by one or more of the user devices, session manager 310 can terminate the WebRTC connection 200. Termination of the WebRTC communication can be initiated by the first user device 130 (moderator). In cases where the first user device 130 may leave the WebRTC channel 200 prior to other user devices, the first user device 130 may delegate authority to another user device (e.g., second user device 140) to terminate the session. Alternatively, session manager 310 may be pre-configured to terminate communication over WebRTC channel 200 after some specified period of time.

Figure 4:
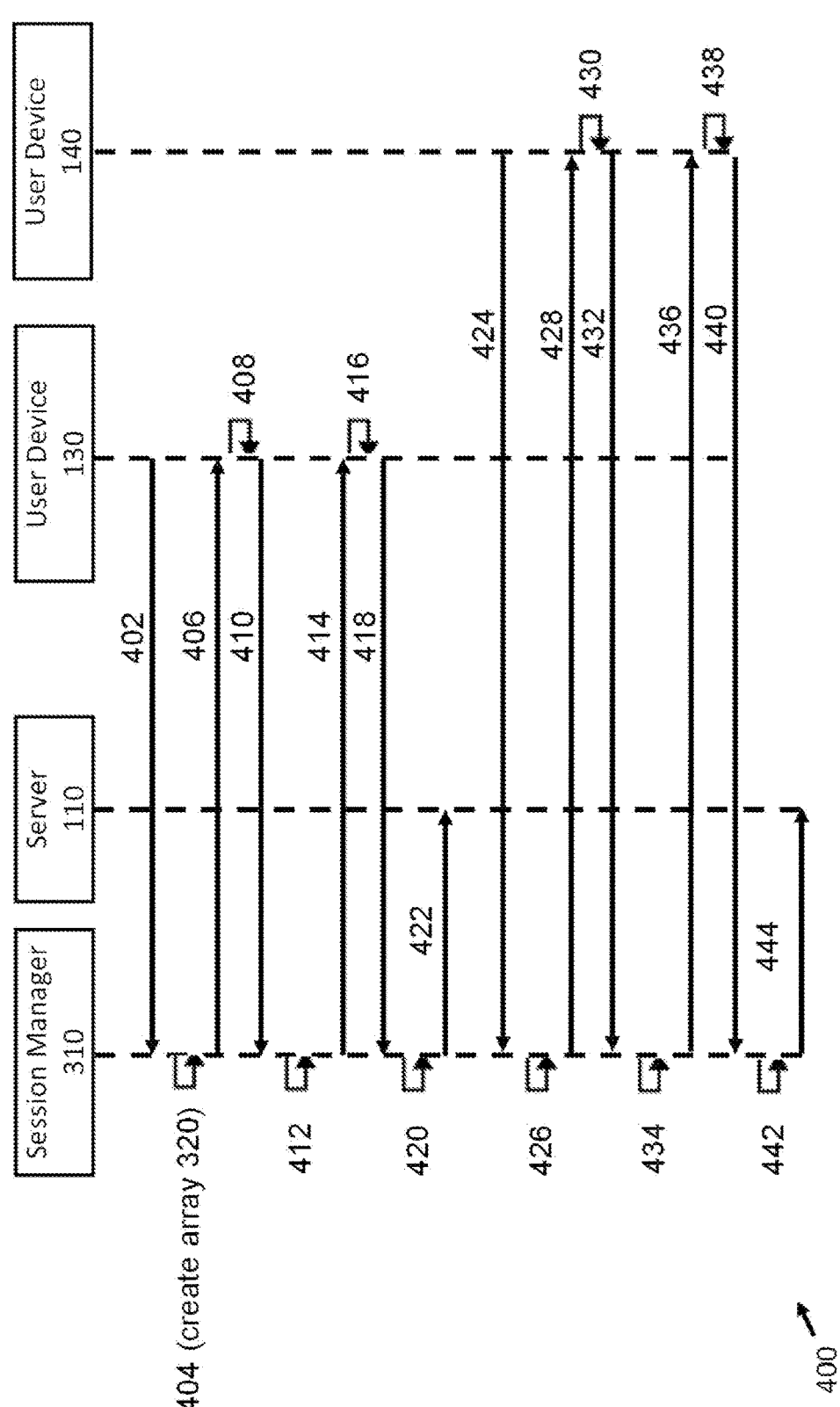
FIG. 4 shows a more detailed setup of a WebRTC alternative channel 400, which may be implemented as channel 300, according to aspects of the present disclosure.

FIG. 4 shows a more detailed setup of a WebRTC alternative channel 400, which may be implemented as channel 300, according to aspects of the present disclosure. In FIG. 4, the session manager 310 sets up a communications channel between user device 130 and user device 140 that is separate from a WebRTC connection, just like channel 300 (FIGS. 3B-3C). Session manager 310 can maintain connectivity between user devices 130 and 140 during a WebRTC session (e.g., the kind of session initiated in setup 200 in FIG. 2B). Session manager 310 can also maintain the connection between user devices 130 and 140 independent of any WebRTC session between these user devices.

As shown in FIG. 4, at step 402, the first user device 130 sends a connection request to the session manager 310. The session manager 310 receives the connection request from user device 130 and, at step 404, creates array 420 stored by the session manager 310 that will hold connection parameters. Array 420 may be like array 320 or 320*a*. Array 620 may be associated with a "room" other connection channel that is specific for communication to user device 130.

At step 406, session manager 310 sends a request to user device 130 to get connection parameters for the user device (e.g., "request getUserMedia( )"). At step 408, the user device 130 returns connection information associated with user device 130 and sends it to session manager 310 at step 410. At step 412, session manager 310 adds the information regarding the user device media associated with user device 130 to the array 420. At step 414, the session manager 310 sends to the user device 130 a request for specific communication parameters (e.g., screen orientation and/or dimensions) specific to the browser or display on user device 130. At step 416, user device 130 collects the particular communications data (e.g., screen orientation and any other parameter discussed above in the context of FIGS. 3B-3D) from the user device. At step 418, the user device 130 then sends the communications data back to the session manager 310. At step 420, the session manager 310 adds the communications data collected in step 416 to array 420. At step 422, session manager 310 indicates to server 110 that the communication channel 200 (FIG. 2A) to user device 130 is available through WebRTC connections. However, at this stage, no WebRTC channel has been initialized. At this point server 110 waits for another user device to request a WebRTC communication.

At step 424, user device 140 sends a connection request to session manager 310. The connection request is specific to the connection to user device 130 (e.g., it may name the "room" or other connection parameters associated with array 420). At step 426, session manager 310 inserts a "user device object" that represents user device 140 into array 420 in response to user device 140's request to connect in step 424. This user device "object" can be, for example, like the data structure "user session" in FIG. 3D. It can contain any of the information described in Table 2 or in FIGS. 3B-3D. In this step, the session manager 310 may also add user device 140 to object. In step 428, the session manager sends a request for connection information (e.g., getUserMedia( )) to user device 140.

At step 430, user device 140 responds to the request in step 428 by obtaining its connection information, then in step 432, providing the information to session manager 310. At step 434, the session manager 310 adds the connection information obtained from user device 140 in step 432 to the object representing user device 140 in array 420. At step 436, session manager 310 sends a request for specific connection parameters (e.g., screen orientation and/or size) to user device 140. At step 438, user device 140 obtains the requested information and sends it back (step 440) to the session manager 310. At step 442, the session manager 310 adds the requested connection data in step 436 to the user device 140 object in array 420. Once this step is complete, the connection channel is established between user devices 130 and 140, and a WebRTC connection can be initiated at step 444. In this step the session manager 310 requests that the server 110 establish the WebRTC connection.

Figure 5:
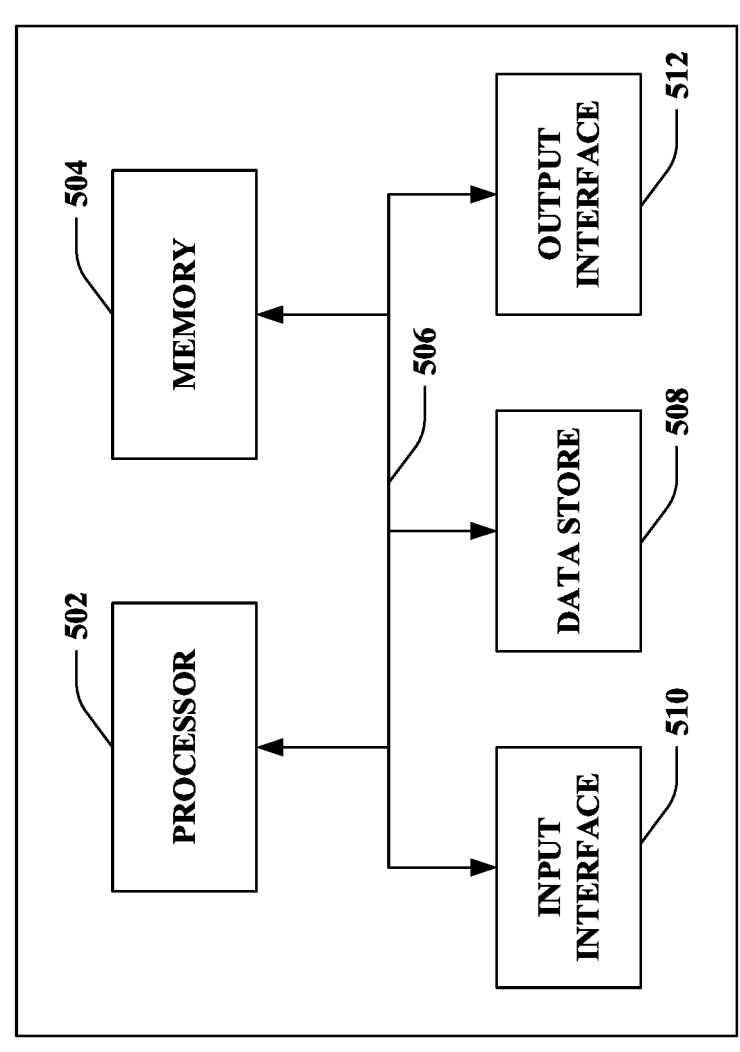
FIG. 5 is a high-level illustration of an exemplary computing device 500 that can be used in accordance with the systems and methodologies disclosed herein.
Figure 5:

Referring now to FIG. 5, FIG. 5 is a high-level illustration of an exemplary computing device 500 that can be used in accordance with the systems and methodologies disclosed herein. For instance, the computing device 500 may be, include, or be included in user devices 130, 140, and 150, servers 110 and 115 and any other user device or computing system described herein.

Computing device 500 includes at least one processor 502 that executes instructions that are stored in a memory 504. The instructions may be, for instance, instructions for implementing functionality described as being carried out by one or more systems discussed above or instructions for implementing one or more of the methods described above. The processor 502 may be a GPU, a plurality of GPUs, a CPU, a plurality of CPUs, a multi-core processor, etc. The processor 502 may access the memory 504 by way of a system bus 506. In addition to storing executable instructions, the memory 504 may also user data, connection data, data specifying characteristics of various communications, and so forth.

The computing device 500 additionally includes a data store 508 that is accessible by the processor 502 by way of the system bus 506. The data store 508 may include executable instructions, connection parameters or data, or any other data described herein. The computing device 500 also includes an input interface 510 that allows external devices to communicate with the computing device 500. For instance, the input interface 510 may be used to receive instructions from an external computer device, etc. The computing device 500 also includes an output interface 512 that interfaces the computing device 500 with one or more external devices.

Additionally, while illustrated as a single system, it is to be understood that the computing device 500 may be a distributed system. Thus, for instance, several devices may be in communication by way of a network connection and may collectively perform tasks described as being performed by the computing device 500.

While various inventive aspects, concepts and features of the disclosure may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present disclosure. Still further, while various alternative embodiments as to the various aspects, concepts and features of the disclosure—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present disclosure even if such embodiments are not expressly disclosed herein. Additionally, even though some features, concepts or aspects of the disclosure may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

I claim:

1. A method for exchanging information between devices comprising, via a session manager located on a server:

receiving a connection request from a first user device via a Web Real-Time Communication (WebRTC) alternative channel;

saving to a memory on the server a communications array storing communication parameters for the first user device;

receiving a connection request from a second user device via the WebRTC alternative channel;

saving to the array communication parameters for the second user device; and initiating a WebRTC connection between the first user device and the second user device based at least in part on the stored communication parameters for the first user device and the stored communications parameters for the second user device; and maintaining the WebRTC alternative channel for communications with the first user device and the second user device during the WebRTC connection, wherein the WebRTC alternative channel is a server-mediated communications channel distinct from WebRTC signaling configured to receive connection requests from multiple user devices identifying a common session and to maintain session-related communication parameters before, during, and after the WebRTC connection.

2. The method of claim 1, further comprising, via the session manager:

monitoring a status of the first user device;

monitoring a status of the second user device; and at least one of:

changing the communications parameters for the first device based on the monitored status of the first device; and changing the communications parameters for the second device based on the monitored status of the second device.

3. The method of claim 1, wherein the communications parameters for the first device and the communications parameters for the second device comprise at least one of a screen orientation and a screen dimension.

4. The method of claim 1, wherein the communications parameters for the first device and the communications parameters for the second device comprise at least one of a resolution of streaming video and a resolution of streaming audio.

5. The method of claim 1, wherein the communications parameters for the first device and the communications parameters for the second device comprise at least one of a connection speed and a user device connection preference.

6. The method of claim 2, wherein the monitoring a status of the first user device and the monitoring a status of the second user device is periodic.

7. The method of claim 2, wherein at least one of changing the communications parameters for the first device and changing the communications parameters for the second device comprises moving a streaming connection from the WebRTC connection to the WebRTC alternative channel.

8. The method of claim 7, wherein the moving a streaming connection increases a bandwidth of the WebRTC connection.

9. The method of claim 7, wherein the moving a streaming connection increases a resolution of the WebRTC connection.

10. The method of claim 1, wherein the session manager maintains the WebRTC alternative channel after the WebRTC connection becomes disconnected.

11. The method of claim 10, wherein the first user device messages the second user device using the WebRTC alternative channel after the WebRTC connection becomes disconnected.

12. The method of claim 1, wherein the communications parameters for the first device and the communications parameters for the second device are not parameters recognized by WebRTC.

13. The method of claim 12, wherein the communications parameters for the first device and the communications parameters for the second device comprise at least one of audio levels and orientation of video streaming.

14. A system for exchanging information between devices comprising a session manager located on a server configured to:

receive a connection request from a first user device via a Web Real-Time Communication (WebRTC) alternative channel;

save to a memory on the server a communications array storing communication parameters for the first user device;

receive a connection request from a second user device via the WebRTC alternative channel;

save to the array communication parameters for the second user device;

initiate a WebRTC connection between the first user device and the second user device based at least in part on the stored communication parameters for the first user device and the stored communications parameters for the second user device; and maintaining the WebRTC alternative channel for communications with the first user device and the second user device during the WebRTC connection, wherein the WebRTC alternative channel is a server-mediated communications channel distinct from WebRTC signaling configured to receive connection requests from multiple user devices identifying a common session and to maintain session-related communication parameters before, during, and after the WebRTC connection.

15. The system of claim 14, wherein the session manager is further configured to monitor a status of the first user device;

monitor a status of the second user device; and at least one of:

change the communications parameters for the first device based on the status of the first device; and change the communications parameters for the second device based on the status of the second device.

16. The system of claim 14, wherein the communications parameters for the first device and the communications parameters for the second device comprise at least one of a screen orientation and a screen dimension.

17. The system of claim 14, wherein the communications parameters for the first device and the communications parameters for the second device comprise at least one of a resolution of streaming video and a resolution of streaming audio.

18. A method for establishing a communications channel by:

storing on a server, via a session manager, an array configured to store communication parameters associated with multiple user devices participating in a common session;

sending, via the session manager to the first user device and a Web Real-Time Communication (WebRTC) alternative channel, a request for information to populate the communication parameters associated with the first user device;

receiving, via the session manager and the WebRTC alternative channel, the requested information for populating the communication parameters associated with the first user device;

storing, on the server via the session manager, the communication parameters associated with the first user device in the array;

receiving, via the session manager and the WebRTC alternative channel, an identifier from the second user device, the identifier identifying the common session initiated by the first user device;

sending, to the second user device via the session manager and the WebRTC alternative channel, a request for information to populate the communication parameters associated with the second user device;

receiving, via the session manager and the WebRTC alternative channel, the requested information for populating the communication parameters associated with the second user device;

storing on the server, via the session manager, the communication parameters associated with the second user device in the array;

establishing, via the session manager, a WebRTC connection between the first user device and the second user device using the communication parameters associated with the first user device and the communication parameters associated with the second user device; and maintaining the WebRTC alternative channel for communications with the first user device and the second user device during the WebRTC connection, wherein the WebRTC alternative channel is a server-mediated communications channel distinct from WebRTC signaling configured to receive connection requests from multiple user devices identifying a common session and to maintain session-related communication parameters before, during, and after the WebRTC connection.

19. The method of claim 18, further comprising:

monitoring a status of the first user device;

monitoring a status of the second user device; and at least one of:

changing the communications parameters for the first device based on the monitored status of the first device; and changing the communications parameters for the second device based on the monitored status of the second device.

20. The method of claim 18, wherein the communications parameters for the first device and the communications parameters for the second device comprise at least one of: a screen orientation, a screen dimension, a resolution of streaming video, and a resolution of streaming audio.

\* \* \* \* \*